US006185674B1

(12) United States Patent
Chan et al.

(10) Patent No.: US 6,185,674 B1
(45) Date of Patent: Feb. 6, 2001

(54) METHOD AND APPARATUS FOR RECONSTRUCTING THE ADDRESS OF THE NEXT INSTRUCTION TO BE COMPLETED IN A PIPELINED PROCESSOR

(75) Inventors: Kin Shing Chan, Austin, TX (US); Chiao-Mei Chuang, Cupertino, CA (US); Alessandro Marchioro, Ferney Voltaire (FR)

(73) Assignee: International Business Machines Corporation, Armonk, NY (US)

( * ) Notice: Under 35 U.S.C. 154(b), the term of this patent shall be extended for 0 days.

(21) Appl. No.: 08/417,421

(22) Filed: Apr. 5, 1995

(51) Int. Cl.$^7$ .................................................. G06F 9/00
(52) U.S. Cl. ............................................ 712/230; 712/233
(58) Field of Search ................................. 395/375, 416, 395/421.04, 421.1, 421.11, 571, 572; 364/261.3; 712/230, 233

(56) References Cited

U.S. PATENT DOCUMENTS

| | | | |
|---|---|---|---|
| 4,679,141 | 7/1987 | Pomerene et al. | 364/200 |
| 4,714,990 | 12/1987 | Desyllas et al. | 364/200 |
| 4,833,599 | * 5/1989 | Colwell et al. | 395/375 |
| 4,914,582 | 4/1990 | Bryg et al. | 364/200 |
| 5,014,240 | 5/1991 | Suzuki | 365/49 |
| 5,093,778 | * 3/1992 | Favor et al. | 395/375 |
| 5,142,634 | * 8/1992 | Fite et al. | 395/375 |
| 5,163,140 | * 11/1992 | Stiles et al. | 395/425 |
| 5,226,130 | * 7/1993 | Favor et al. | 395/375 |
| 5,430,851 | * 7/1995 | Hirata et al. | 395/375 |
| 5,454,117 | * 9/1995 | Puziol et al. | 395/800 |

(List continued on next page.)

FOREIGN PATENT DOCUMENTS

| | | |
|---|---|---|
| 2277819 | 11/1994 | (GB) . |
| 2284912 | 6/1995 | (GB) . |

OTHER PUBLICATIONS

Dictionary of Computers, information processing & telecommunications, second edition by Rosenberg, p. 357, 1984.*

G.F. Grohoski, "Machine organization of the IBM RISC System/6000 Processor", IBM J. Res. Develop., vol. 34 #1, Jan. 1990 pp. 37–58.

A. Davis et al. "Fully Integrated Cache Architecture", S.N. 08/060,776, Filed May 11, 1993, Grp. Art Unit 2312.

"Superscalar Microprocessor Design", Mike Johnson, Advanced Micro Devices, Chapter 5, The Role of Exception Recovery, Prentice Hall, Englewood Cliff, NJ 07632.

Primary Examiner—Zarni Maung
(74) Attorney, Agent, or Firm—Jay P. Sbrollini

(57) ABSTRACT

A computer processing unit is provided that includes an apparatus for generating an address of the next instruction to be completed. The apparatus includes a first table for storing a plurality of entries each corresponding to a dispatched instruction, each entry comprising an identifier that identifies the corresponding instruction and a status bit that indicates if the corresponding instruction is completed; a second table for storing a plurality of entries each corresponding to dispatched branch instructions, each entry comprising the same identifier stored in the first table, a target address of the dispatched branch instruction and a resolution status field that indicates at least if the corresponding branch instruction has been resolved taken or has been resolved not taken; program counter update logic that, in each machine cycle, updates a program counter to store and output the address of the next instruction to be completed according to the entries stored in the first table and the second table.

Because the first and second tables employ efficient identification tags to identify instructions that modify the control flow of the execution pipeline and the target address of such instructions, the computer processing unit of the present invention need not store the full address of each instruction in the execution pipeline to update the program counter as is conventional, and thus saves real estate that may be used for other circuitry.

18 Claims, 11 Drawing Sheets

U.S. PATENT DOCUMENTS 5,461,722    10/1995  Goto .
5,471,597  * 11/1995  Byers et al. .......................... 395/375
5,488,729  *  1/1996  Vegesna et al. ..................... 395/800
5,553,255  *  9/1996  Jain et al. ............................ 395/375
5,553,256  *  9/1996  Fitterman et al. ................... 395/375
5,608,886  *  3/1997  Blomgren et al. ................... 395/586

* cited by examiner

ENTRY FORMAT FOR BTAT 115

| IDD | TA | V | RESOLUTION STATUS | SPECULATION TAG |
|-----|----|----|-------------------|-----------------|

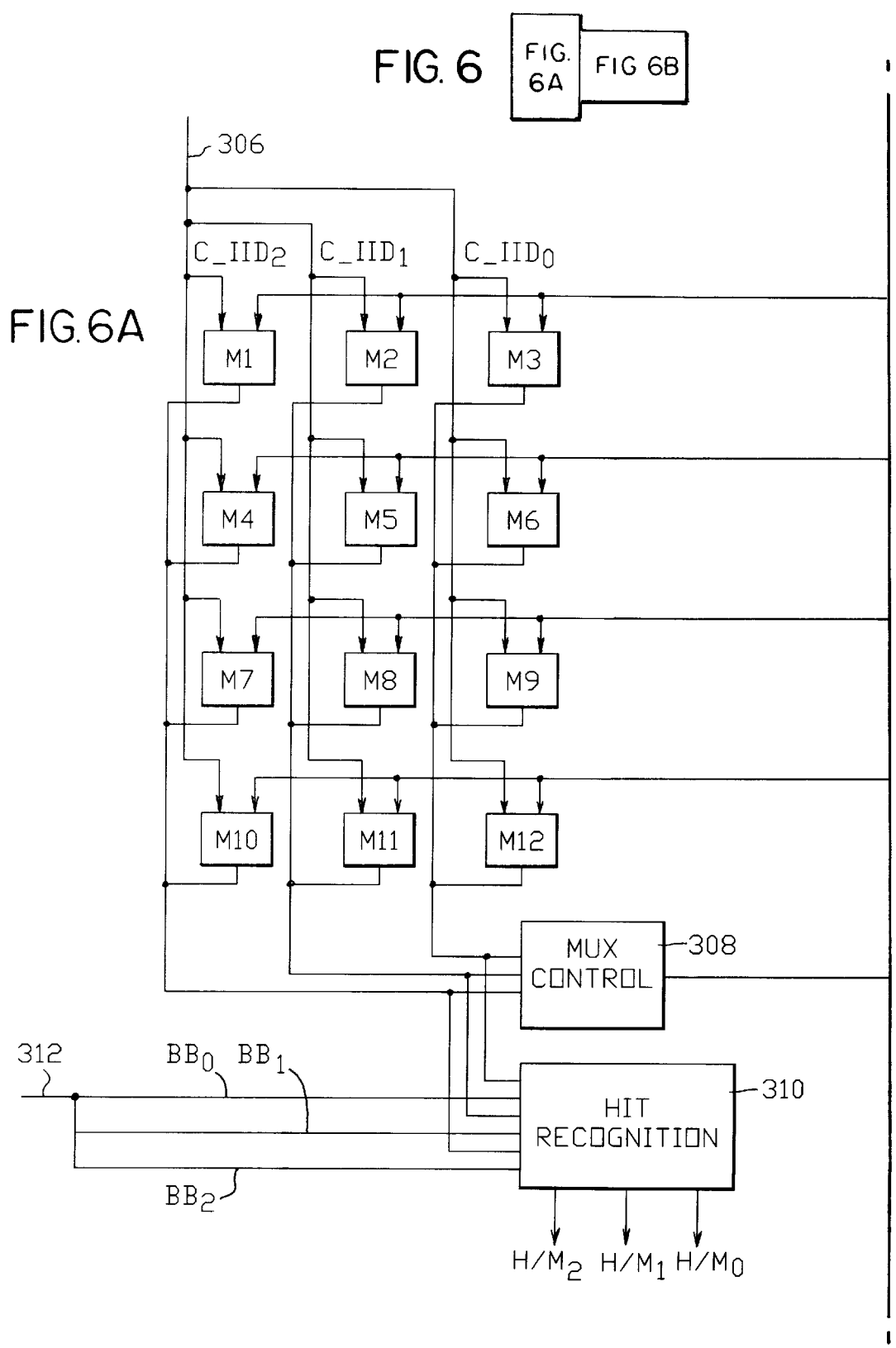

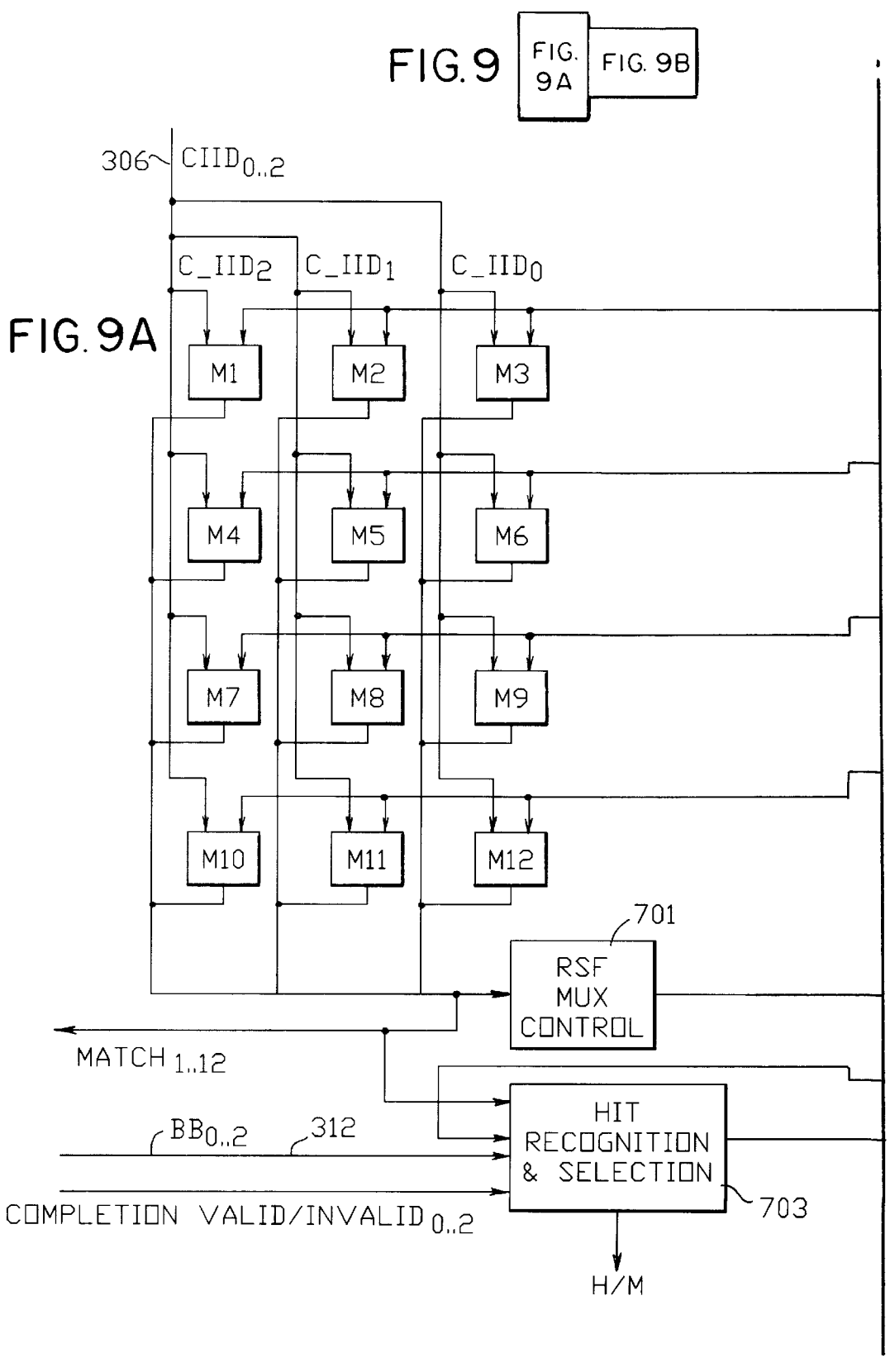

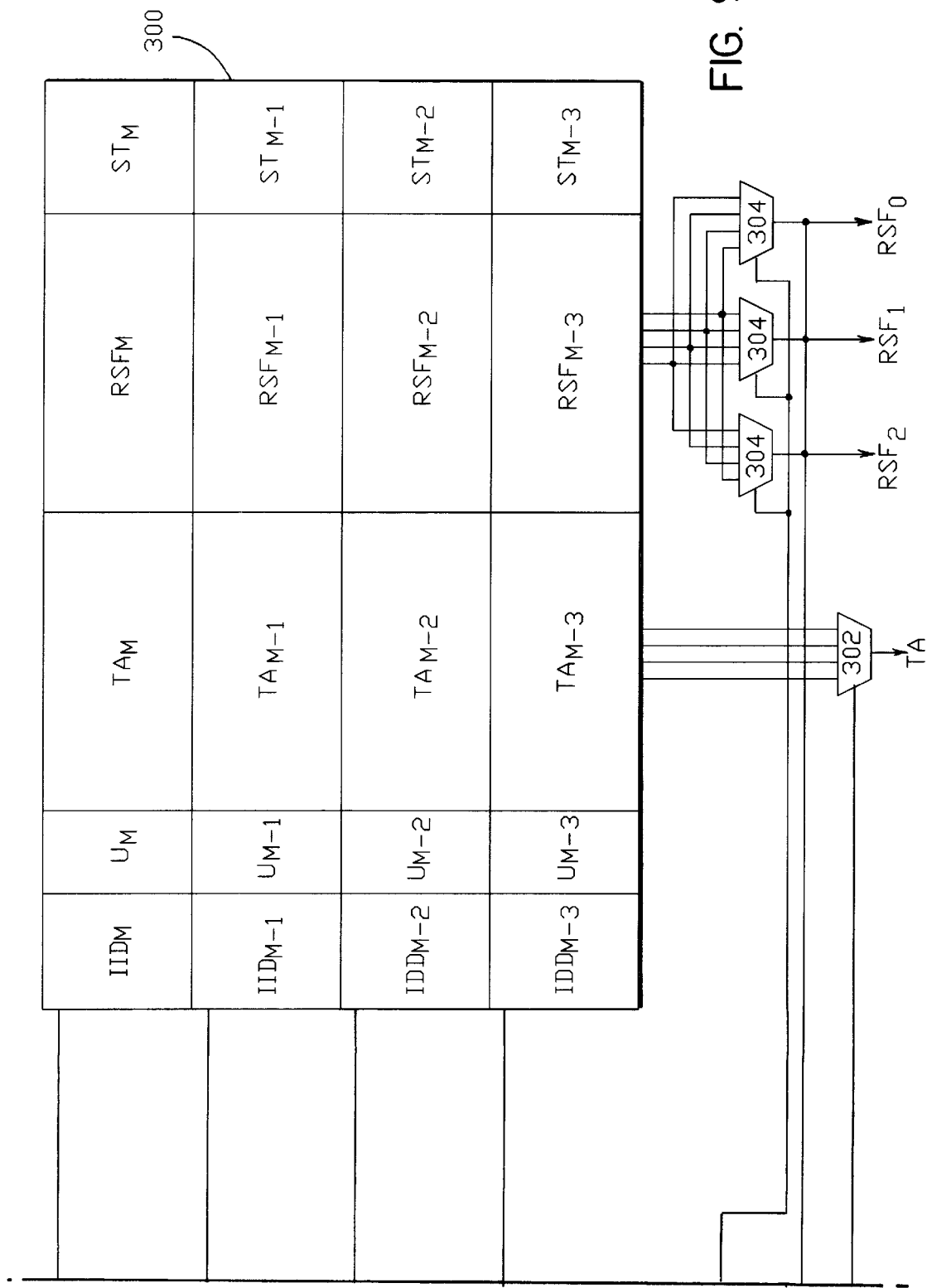

METHOD AND APPARATUS FOR RECONSTRUCTING THE ADDRESS OF THE NEXT INSTRUCTION TO BE COMPLETED IN A PIPELINED PROCESSOR

BACKGROUND OF THE INVENTION

1. Technical Field

The invention relates to computer processor units and, more particularly, to reconstructing the address of the next instruction to be completed in pipelined computer processing units.

2. Description of the Prior Art

Pipelined processors divide the processing of instructions into a number of stages such that several instructions can be processed simultaneously, thereby providing improved efficiency and performance with respect to conventional non-pipelined processors. More recently superscalar processors, such as the Pentium processor from Intel and the PowerPC 601, 603, 604 and 620 processors from Apple/IBM/Motorola have been developed that utilize multiple instruction pipelines to provide the ability to execute multiple instructions in a single clock cycle. Thus, superscalar and pipelined microprocessors process a large number of instructions concurrently.

As shown in FIG. 1, the structure of these devices typically may be broken down into four stages. In the fetch stage, a copy of one or more instructions are obtained from memory and placed into an input queue. In the dispatch stage, one or more instructions are read from the input queue and examined to initialize the control signals that are required for execution, and then dispatched to the execution unit(s). In the execution stage, when resources are available, one or more instructions are executed. Finally, in the completion stage, the results produced by the execution unit(s) are committed to the architected registers.

The instructions are typically fetched and dispatched in order, but may be executed out of order. In order to give the illusion of a traditional sequential machine, the instructions are finally reordered at completion time. Such an architecture has the advantage of decoupling instruction fetch from execution, thus providing higher performance.

In addition, branch prediction and prefetch control logic may be utilized to fetch, dispatch and execute instructions speculatively. However, these speculative instructions are not completed until the speculative conditions have been resolved. Such speculative fetching and execution also improves system performance in most applications.

Microprocessors that incorporate the structure of FIG. 1 typically include a program counter that stores the memory address of the last instruction completed by the completion stage such that the microprocessor can service interrupts and/or program exceptions. Upon experiencing an interrupt/exception, the current address of the program counter is saved. The program counter is then initialized with an address vector corresponding to the interrupt/exception and the instruction pipeline reset for fetching, dispatching, executing and completing the instructions of the interrupt/exception. To return from the interrupt/exception, the stored address value (or the next sequential address following the stored address value) is loaded into the program counter and the instruction pipeline is reset for fetching, dispatching, executing and completing the instruction sequence that the microprocessor left to service the interrupt/exception.

Conventionally, the program counter is implemented by saving the full address of each instruction in the fetch stage, and writing the full address+1 or target address to the program counter upon completing the instruction. However, this implementation may be unsuitable for use in superscalar and deeply pipelined microprocessors that process a large number of instructions concurrently. In these applications, storing the full address of each instruction requires that a large amount of information be stored, and thus may consume an unacceptable amount of real estate.

It is therefore an object of the present invention to provide a system that utilizes a limited amount of stored information and a small amount of real estate to perform the conventional functions of the program counter, and is thus suitable for use in superscalar and pipelined microprocessors.

SUMMARY OF THE INVENTION

According to the present invention, a computer processing unit is provided that includes an apparatus for generating an address of the next instruction to be completed. The apparatus includes a first table for storing a plurality of entries each corresponding to a dispatched instruction, each entry comprising an identifier that identifies the corresponding instruction and a status bit that indicates if the corresponding instruction is completed; a second table for storing a plurality of entries each corresponding to dispatched branch instructions, each entry comprising the same identifier stored in the first table, a target address of the dispatched branch instruction and a resolution status field that indicates at least if the corresponding branch instruction has been resolved taken or has been resolved not taken; program counter update logic that, in each machine cycle, updates a program counter to store and output the address of the next instruction to be completed according to the entries stored in the first table and the second table.

More specifically, the program counter update logic, in each machine cycle, reads out one or more entries from said first table, and for each entry corresponding to a branch instruction and whose status bit indicates the corresponding branch instruction is completed, accesses the second table with the associated identifier of the entry to determine if a corresponding entry exists in the second table. If the second table includes one corresponding entry whose resolution status field indicates the branch instruction has been resolved taken, the program counter update logic updates the program counter to correspond to the target address of the one entry plus any offset associated with subsequent completed sequential instructions. If the second table includes more than one corresponding entry whose resolution status field indicates the branch instruction has been resolved taken, the program counter update logic updates the program counter to correspond to the target address of one of the corresponding entries plus any offset associated with subsequent completed sequential instructions, wherein said one of the corresponding entries is associated with an instruction latter in program sequence relative to instructions associated with other of the corresponding entries. If the second table does not include at least one corresponding entry whose resolution status field indicates the branch instruction has been resolved taken, the program counter update logic updates the program counter to correspond to the address associated with completed sequential instructions. Moreover, if each of the one or more entries read out from the first table do not correspond to a branch instruction, the program counter update logic updates the program counter to correspond to the address associated with completed sequential instructions.

Because the first and second tables employ efficient identification tags to identify instructions that modify the control flow of the execution pipeline and the target address of such instructions, the computer processing unit of the present invention need not store the full address of each instruction in the execution pipeline to update the program counter as is conventional, and thus saves real estate that may be used for other circuitry.

BRIEF DESCRIPTION OF THE DRAWINGS

FIG. 3 is a pictorial representation of the instruction sequence table (IST) of FIG. 2;

FIG. 4 is a pictorial representation of the format of an entry of the branch target address table (BTAT) of FIG. 2;

FIG. 9 is a functional block diagram of a hardware implementation of the BTAT of FIG. 2 according to the second embodiment of the present invention.

DETAILED DESCRIPTION OF THE PREFERRED EMBODIMENTS

Figure 2:
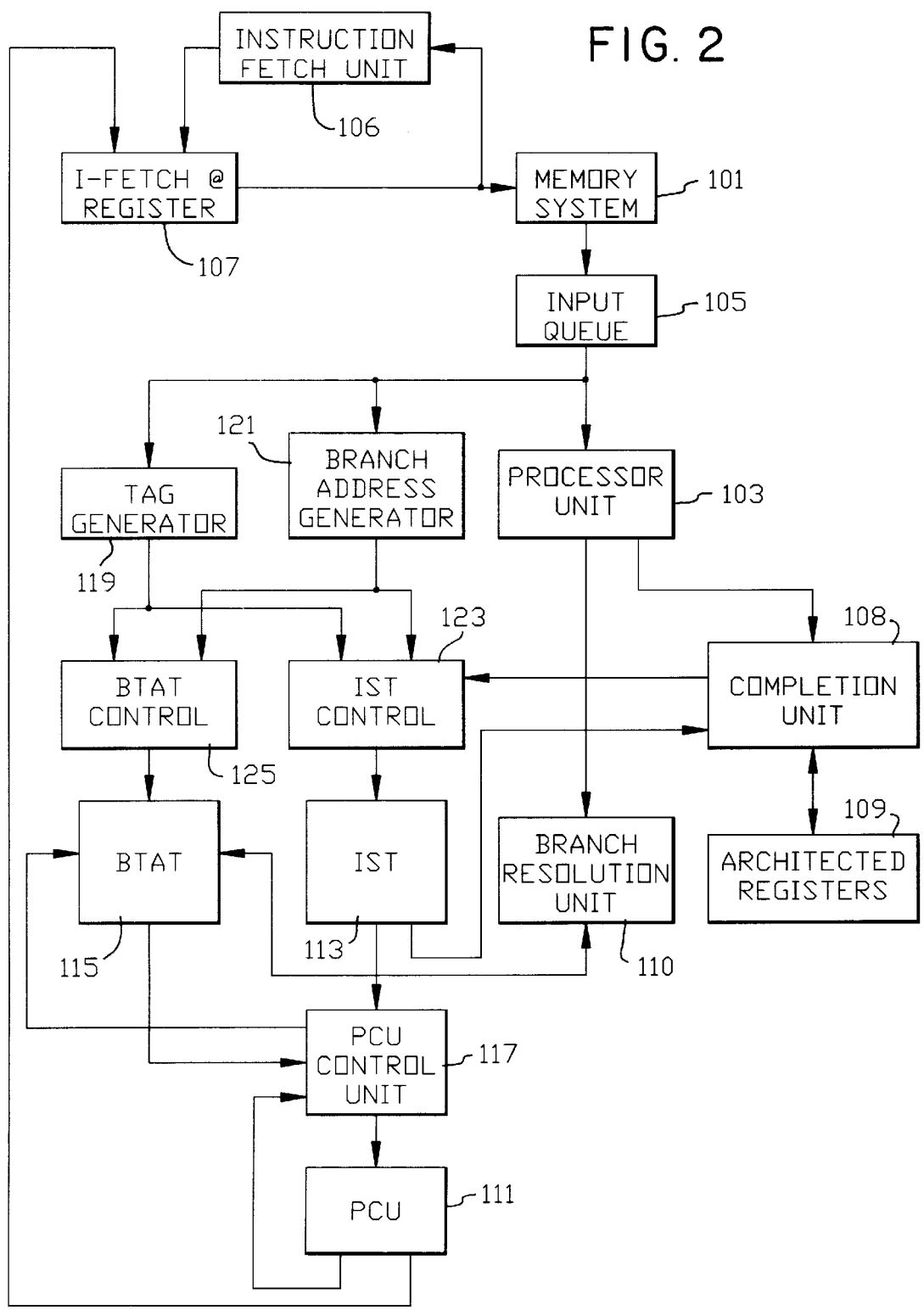
FIG. 2 is a functional block diagram of a computer processing unit according to the present invention.

With reference to FIG. 2, a high performance pipelined computer processing unit includes a memory system 101 that stores instructions to be executed by a processor unit 103 as well as data associated with the instructions executed by the processor unit 103. As is conventional, the memory system 101 may include a main memory and a cache memory subsystem. The cache memory subsystem may be a conventional combined data/instruction cache type, or in the alternative a split cache. Typically, the cache is a set associative structure.

An input queue 105 is connected to receive instructions fetched from the memory system 101. Instructions may be fetched from the memory system 101 individually or in a group commonly called a block. Fetching blocks of instructions is preferable in cache systems because it provides greater cache access for operands. In current practice, a block is typically a quadword (QW—16 bytes) or eight words (32 bytes), but in future machines the block size may be larger. Moreover, instructions may or may not be aligned on block boundaries.

The fetching of instructions from the memory system 101 into the input queue 105 is coordinated by an instruction fetch unit 106. The functions of the instruction fetch unit 106 may include address generation and translation of instruction fetch addresses. The primary function of the instruction fetch unit 106 is loading into an I-FETCH address register 107 the address that identifies the block of instructions to be fetched from the memory system 101 into the input queue 105. The instruction fetch unit 106 may also include prefetch logic that controls the speculative prefetch of instructions and/or data from the memory system 101 into the input queue 105. Typically, such prefetch logic includes a branch history table and associative control logic. A more detailed description of an example of such prefetch logic may be found in Pomerene et al., U.S. Pat. No. 4,679,141, which is commonly assigned to the assignee of the present invention and herein incorporated by reference in its entirety.

The processor unit 103 typically includes at least one instruction register that stores the instruction(s) dispatched from the input queue 105, an instruction decoder that decodes the contents of the instruction register and schedules decoded instructions for execution by execution and control logic, which may include one or more hardware execution elements. For example, PowerPC architecture includes three pipelined execution units: a branch processing unit for executing all branch instructions, a fixed point unit for executing all fixed-point instructions, and a floating point unit for executing all floating point operations. A detailed example of such hardware execution elements may be found in Grohoski, *Machine Organization of the IBM RISC System/6000 Processor*, IBM J. Res. Develop., Vol. 34 No. 1, January 1990, pp. 37–58, herein incorporated by reference in its entirety.

The results of the instructions executed by the hardware execution elements of the processor unit 103 are supplied to a completion unit 108 which, if executed out of order, reorders the results and updates the architected registers 109 accordingly.

A branch resolution unit 110 receives at least the results of branch instructions executed by the hardware execution elements of the processor unit 103 and, according to these results, controls the fetching, dispatch and execution of the instruction stream by the instruction fetch unit 106, input queue 105 and processor unit 103, respectively.

According to the present invention, the memory address of the next instruction to be completed, commonly known as the program counter, is stored in a program counter unit (PCU) 111. The memory address stored in the PCU 111 is principally provided by an instruction sequence table (IST) 113, a branch target address table (BTAT) 115 and a PCU control unit 117. Generally, the IST 113 stores an identification tag (IID), a branch bit (BB), and a finished bit (FB) for each instruction dispatched from the input queue 105 to the processor unit 103. The IID uniquely identifies the particular instruction from other instructions in the execution stream. The BB when set indicates the particular instruction is a control flow modifying instruction, hereinafter called a branch instruction. When not set, the BB indicates the instruction is a sequential (non-branch) instruction. The FB when set indicates the instruction has been completed. When not set, the FB indicates the instruction is not yet completed. The BTAT 115, on the other hand, stores the IID, associated target address (TA), and resolution status (i.e., unresolved, resolved taken, resolved not taken) of all branch instructions dispatched from the input queue 105 to the processor unit 103.

During each machine cycle, the PCU control unit 117 reads the IID and FB of one or more instructions from the IST 113. For each instruction read from the IST 113 whose FB is set, the PCU control unit 117 accesses the BTAT 115 with the IID of the particular instruction. The BB of the instructions read from the IST 113 by the PCU control unit 117 may be supplied to the BTAT 115 directly, or via the PCU control unit 117. As described above the BTAT 115 stores the IID, target address TA, and resolution status of all branch instructions.

For machines that complete only one instruction per cycle, the BTAT 115 queries [1] whether the IID of the completed instruction provided by the PCU control unit 117 matches the IID of stored branch instructions and [2] whether the BB of the instruction is set. If a match is found and the corresponding BB is set, the BTAT 115 outputs the target address TA and resolution status associated with the instruction and a hit signal indicating a valid match was found. Otherwise, the BTAT 115 outputs a miss signal indicating a valid match was not found. Upon receiving the hit signal, the PCU control unit 117 queries whether the resolution status of the instruction output from the BTAT 115 indicates the branch instruction was resolved taken, and if so loads the target address TA output from the BTAT 115 into the PCU 111. However, if the resolution status of the instruction indicates the branch instruction has been resolved not taken, or in the alternative, upon receiving the miss signal, the PCU control unit 117 loads the next sequential address (PC+1) into the PCU 111.

For machines capable of completing more than one instruction per cycle, the operation of the PCU 111, the PCU control unit 117, and the BTAT 115 is more complicated because more than one taken branch instruction may be completed in the cycle. In this case, the PCU control unit 117 accesses the BTAT 115 with the IID of each instruction whose FB is set. The BTAT 115 queries [1] whether the IID of the instructions supplied by the PCU control unit 117 matches the IID of stored branch instructions, and [2] whether the BB of the corresponding instruction is set. If a match is found and the corresponding BB is set, the BTAT 115 outputs the target address TA and resolution status associated with the instruction and a hit signal indicating a valid match was found. Otherwise, the BTAT 115 outputs a miss signal indicating a valid match was not found.

According to the hit/miss and resolution status signals output from the BTAT 115 and the FB of each of the instructions read from the IST 113, the PCU control unit 117 selects the target address TA of a particular branch instruction resolved taken that is latter in program sequence relative to other branch instructions resolved taken, determines an offset that corresponds to the number of sequential instructions completed after the particular branch instruction, and loads the selected target address TA plus offset into the PCU 111.

For example, consider the case where the processor unit 103 may complete three instructions in a cycle, wherein the first instruction read from the IST 113 is a completed branch instruction resolved taken and the next two instructions read from the IST 113 are completed sequential instructions. In this case, PCU control unit 117 loads into the PCU 111 an address that corresponds to the target address of the first instruction plus the offset associated with the second and third completed sequential instructions. Thus, in the case, the address loaded into the PCU 111 would be the instruction address immediately following the address of the third instruction.

In another example, if the first instruction read from the IST 113 is a completed branch instruction resolved taken, the second instruction is a completed branch instruction resolved not taken, and the third instruction is a completed sequential instruction, the PCU control unit 117 loads into the PCU 111 an address that corresponds to the target address of the first instruction plus the offset associated with the second branch instruction resolved not taken and third sequential instruction. In this case, the address loaded into the PCU 111 would be the instruction address immediately following the address of the third instruction. However, in this example, if the second instruction is also a branch instruction resolved taken, the address loaded into the PCU 111 corresponds to the target address of the second instruction plus the offset associated with the third instruction. Again, the address loaded into the PCU 111 would be the instruction address immediately following the address of the third instruction.

Finally, consider another example wherein the first instruction read from the IST 113 is a completed branch instruction resolved taken, the second instruction is a completed sequential instruction, and the third instruction is a completed branch instruction resolved taken. In this case, because the third instruction is latter in program sequence relative to other branch instructions read from the IST 113 that have been completed and have been resolved taken, the PCU control unit 117 loads into the PCU 111 an address that corresponds to the target address of the third instruction.

In the case where the processor unit 103 may complete three instructions in a cycle, the PCU control unit 117 may also determine if completed instructions are preceded in the IST 113 by instructions that are not yet completed, and update the PCU 111 accordingly. For example, consider the case wherein the first instruction read from the IST 113 is completed sequential instruction, the second instruction is a branch (or sequential) instruction not yet completed, and the third instruction is a completed sequential instruction. In this case, PCU control unit 117 loads into the PCU 111 an address that corresponds to the offset associated with the first instruction, thus disregarding the completion of the third instruction until the preceding second instruction has been completed. In effect, the PCU control unit 117 may wait until preceding instructions have been completed before updating the PCU 111.

On the other hand, if all of the instructions read from the IST 113 have an FB set, but do not have a BB set (i.e. all are completed sequential instructions), in this case, the PCU control unit 117 loads the address of the next sequential instruction into the PCU 111. For example, in the case where the processor completes three sequential instructions in a cycle, the address loaded by the PCU control unit 117 into the PCU 111 corresponds to the next sequential instruction (PC+3).

Having provided a general description of the system for storing the address of the next instruction to be completed, a more detailed hardware embodiment is now set forth. For illustrative purposes only, the embodiment described below is part of a system capable of executing three instructions per cycle. However, the invention is not limited in this respect, and may be used in systems capable of executing one or more instructions per cycle.

Specifically, instruction(s) dispatched from input queue 105 to the processor unit 103 for execution are supplied to a tag generator 119 and branch address generator 121. The tag generator 119 generates the IID corresponding to each instruction. The tag generator 119 may store a plurality of next available identifiers (for example, the next five available identifiers) and assign one or more of the stored available identifiers to the dispatched instructions depending upon the number of instructions dispatched from the input queue 105 to the processor unit 103. The branch address generator 121 determines if each dispatched instruction is a sequential type instruction, a conditional branch type instruction or an unconditional branch type instruction and outputs a control signal indicating the type of each instruction. In addition, for conditional and unconditional branch type instructions, the branch address generator 121 generates the target address of the instruction.

The IID output from the tag generator 119 and control signal output from the branch address generator 121 are supplied to an instruction sequencing table control unit (IST control unit) 123 and branch target address control unit (BTAT control unit) 125. In addition, the target address of branch instructions generated by the branch address generator 121 is supplied to the BTAT control unit 125.

The IST control unit 123 inserts the IID output from the tag generator 119 as an entry of the IST 113. Preferably, the IST 113 is ordered logically as a first-in first-out structure. In this case, the IST control unit 123 inserts the IID output from the tag generator 119 as the top entry of the IST 113. Thus, the IST 113 maintains an ordered list of the identifiers IID of each instruction dispatched for execution. In addition, if the control signal output from the branch address generator 121 identifies the instruction as a conditional or unconditional branch type instruction, the IST control unit 123 marks the branch bit (BB) associated with the IID of the branch type instruction in the IST 113. The IST control unit 121 may also initialize the FB associated with the IID of the instruction to indicate the instruction has yet to be completed.

Figure 3:
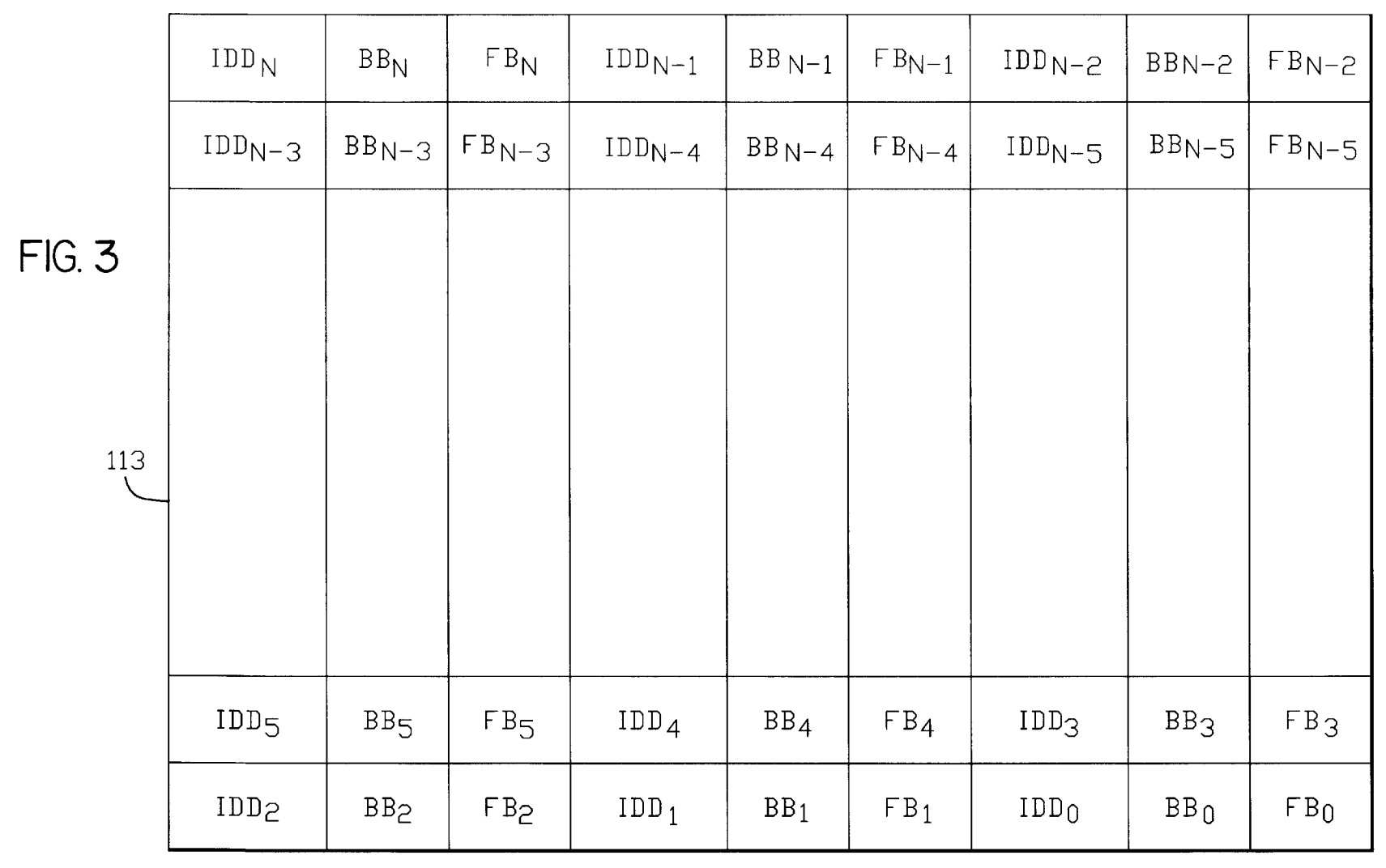

An example of the structure of the IST 113 is shown in FIG. 3. The IID tag, BB and FB of the most recent instructions (i.e., $IID_N$, $BB_N$, $FB_N$, $IID_{N-1}$, $BB_{N-1}$, $FB_{N-1}$, $IID_{N-2}$, $BB_{N-2}$, $FB_{N-2}$) are loaded into the top of the IST 113 by the IST control unit 123. The IID tag, BB and FB of the most aged instructions (i.e., $IID_2$, $BB_2$, $FB_2$, $IID_1$, $BB_1$, $FB_1$, $IID_0$, $BB_0$, $FB_0$) are read from the bottom of the IST 113. Preferably, the number of entries in each row of the IST 113 correspond to the number of instructions that the processor unit 103 is capable of completing in a single cycle. For example, the IST 113 of FIG. 3 is designed for a system in which the processor unit 103 is capable of completing three instructions per cycle and, thus, includes three entries in each row.

The BTAT control unit 125 receives the IID output from the tag generator 119, the control signal output from the branch address generator 121, and, for conditional and unconditional branch type instructions, the target address of the branch instruction. If the control signal output from the branch address generator indicates the instruction is a conditional or unconditional branch instruction, the BTAT control unit 125 stores the IID and associated target address TA of the particular branch instruction as an entry in the BTAT 115. As shown in FIG. 4, each entry of the BTAT 115 may also include a usage bit (U) that indicates the entry is in use and a resolution status field (RSF) that indicates whether the branch is unresolved, resolved taken or resolved not taken. In this case, if the control signal output from the branch address generator 121 indicates the particular instruction is an unconditional branch type instruction, the BTAT control unit 125 sets the U bit of the entry and sets the RSF of the entry to resolved taken. However, if the control signal output from the branch address generator 121 indicates the particular instruction is a conditional branch type instruction, the BTAT control unit 125 sets the U bit of the entry and initializes the RSF of the entry to unresolved.

Figure 1:
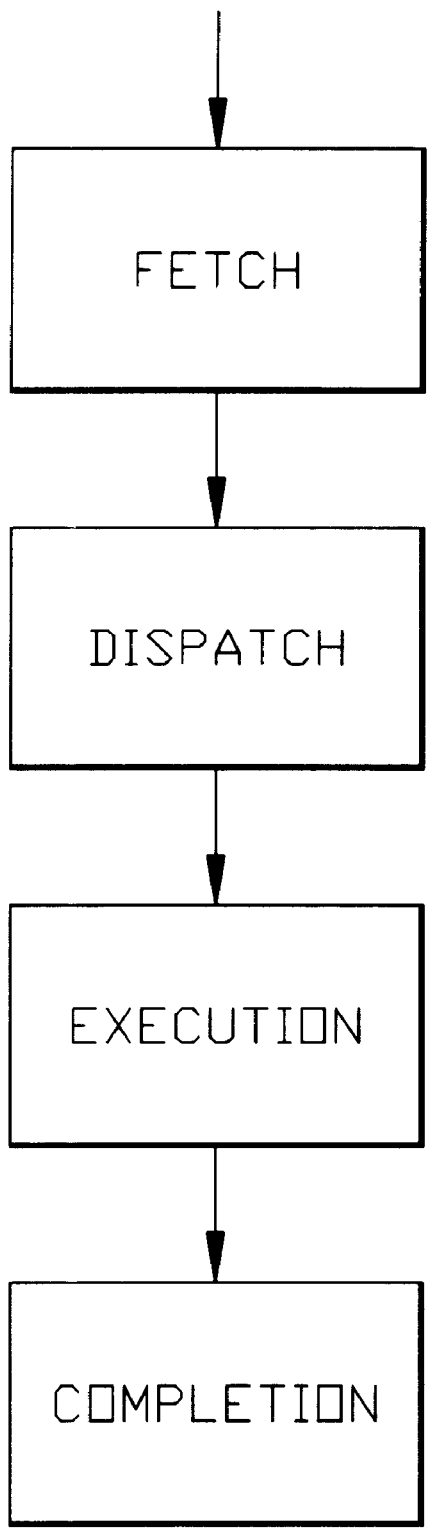
FIG. 1 is a flow chart illustrating the pipeline structure of the computer processing unit of the present invention.

In addition, the computer processing unit of FIG. 1 may support speculative execution of branch type instructions. More particularly, some branch instructions may themselves depend upon the resolution of previous unresolved conditional branch instructions (i.e., the branch instruction lies in a speculative path). In this case, as shown in FIG. 4, each entry of the BTAT 115 may include a speculation tag (ST) that identifies that the instruction is part of a speculative path and identifies the speculative branch instruction from which it depends. Moreover, the control signal output from the branch address generator 121 not only indicates if the dispatched instruction is a sequential type instruction, condition branch type instruction or unconditional branch type instruction, but also includes a branch tag that identifies if the instruction is part of a speculative path and, if so, the speculative branch instruction from which it depends. The branch tag output from the branch address generator 121 is supplied to the BTAT control unit 125. If the branch tag of the dispatched instruction identifies the instruction as belonging to a speculative path, the BTAT control unit 123 sets the ST of the entry in the BTAT 115 accordingly. The speculation tag may be one or more bits depending upon the encoding scheme, and preferably reflects the number of speculative paths that may be taken by the instruction fetch unit 106. For example, consider the case where the instruction fetch unit 106 may pursue two speculative paths labeled, for example, A and B. In this case, the ST of the entries of the BTAT 115 may include two bits $ST_0$, $ST_1$. $ST_0$ when set indicates the entry is part of the first speculative path A, and when cleared indicates the entry is not part of the first speculative path A. On the other hand, $ST_1$ when set indicates the entry is part of the second speculative path B, and when cleared indicates the entry is not part of the second speculative path B.

The BTAT 115 as described above requires updating. For instance, the resolution status of each conditional branch instruction stored in the BTAT 115 is preferably updated upon the resolution of the particular branch instruction. This may be achieved by the branch resolution unit 110 which, upon determining the resolution (taken/not taken) of conditional branch instructions that have completed execution by the processor unit 103, updates the BTAT 115 accordingly. The branch resolution unit 110 accomplishes this by associatively searching the entries of the BTAT 115 to locate the entry whose IID matches the IID of the completed branch instruction, and updating the RSF of the matching entry accordingly.

The branch resolution unit 110 may also update the BTAT 115 upon the resolution of speculatively executed branch instructions. In this case, if the branch resolution unit 110 determines that a speculatively executed branch instruction was wrongly executed (i.e., a branch instruction speculatively executed as taken is resolved not taken, or a branch instruction speculatively executed as not taken is resolved taken), branches depending from the wrongly executed branch instruction must be cancelled from the BTAT 115. The branch resolution unit 110 accomplishes this by associatively searching all the entries of the BTAT 115 to find instructions that share the ST of the wrongly executed branch instruction, and for those instructions with the matching ST, clearing the U bit, thus freeing the corresponding entry in the BTAT 115.

For example, in the example described above, upon determining that the speculatively executed branch instruction at the root of the first speculative path A was wrongly executed, the branch resolution unit 110 would update the BTAT 115 by associatively searching all the entries of the BTAT 115 to find instructions having a set $ST_0$ bit. For those instructions with $ST_0$ bit set, the U bit is cleared, thus freeing the corresponding entry in the BTAT 115. The update of the entries of the BTAT 115 may be accomplished in a manner similar to updating the lines of a cache memory as described in U.S. Pat. No. 4,914,582 to Bryg et al., U.S. Pat. No. 5,014,240 to Suzuki, and U.S. patent application Ser. No. 08/060,776 in the name of Davis et al., entitled "Fully Integrated Cache Architecture" and commonly assigned to the assignee of the present invention, all herein incorporated by reference in their entirety.

In addition, the branch resolution unit 110 may also update the IST 113 upon the resolution of speculatively executed branch instructions and/or wrongly dispatched instructions. This may be accomplished as follows. Preferably, the IST control unit 123 includes a register that stores a pointer to the next available address of the IST 113. The IST control unit 123 writes new entries to the IST 113 at locations corresponding to the pointer stored in the register, and updates the register accordingly. When the branch resolution unit 110 determines that an instruction was wrongly executed and/or dispatched, the branch resolution unit 110 deletes the entries subsequent to the wrongly executed and/or dispatched instruction by updating the register of the IST control unit 123 to point to the address of the particular wrongly executed and/or dispatched instruction.

Figure 5:
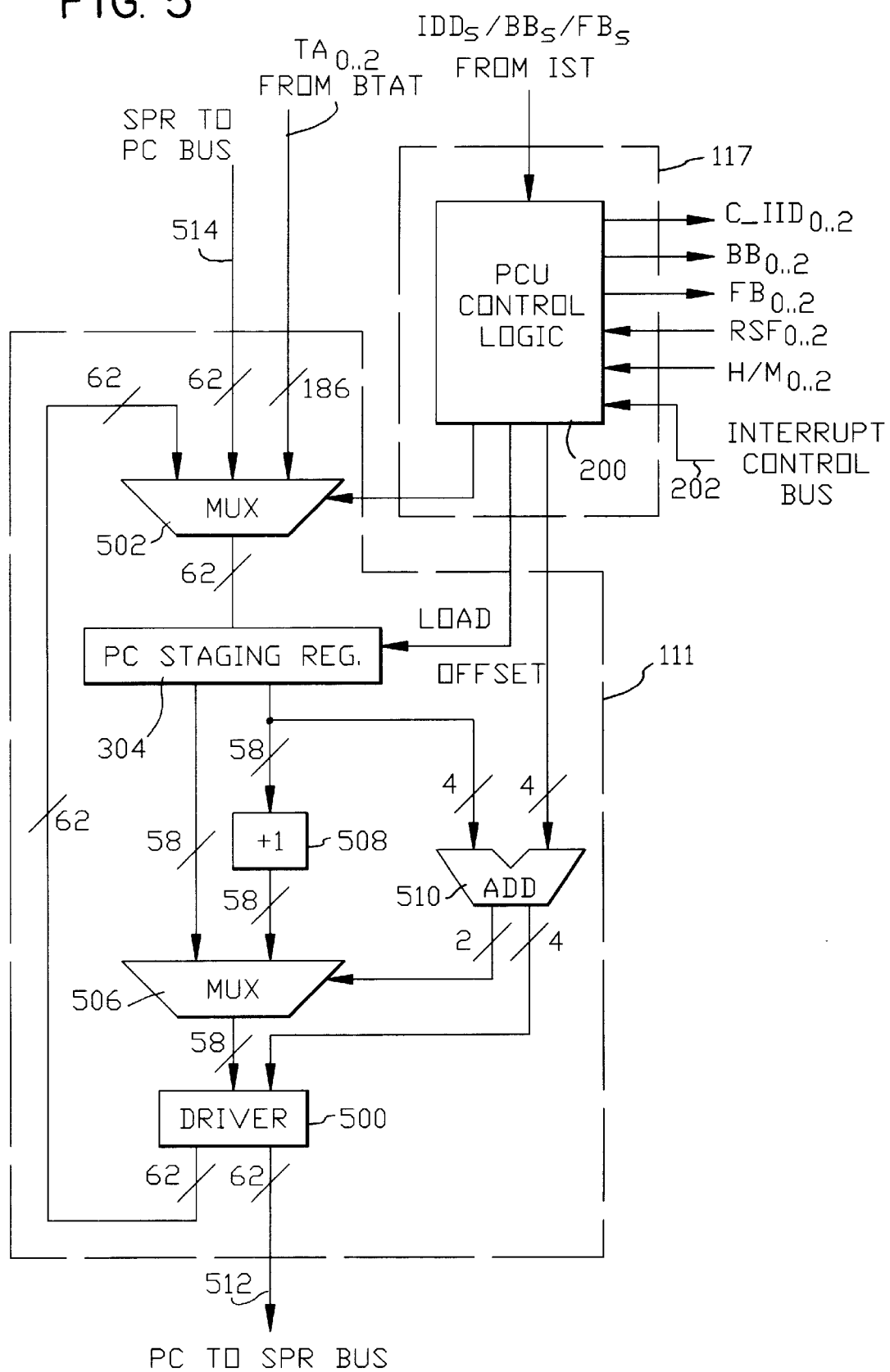
FIG. 5 is a functional block diagram of the Program Counter Unit (PCU) and PCU Control Unit of FIG. 2.

Having described the general operation of the IST 113, BTAT 115, PCU control unit 117 and PCU 111, a specific hardware embodiment of these elements as described above is now set forth. With reference to FIG. 5, the PCU control unit 117 includes PCU control logic 200 that in each machine cycle reads from the IST 113 the IID and FB corresponding to the maximum number of instructions that may be completed by the processor unit 103 in the cycle. For example, the PCU control logic 200 may read $IID_2$, $FB_2$, $IID_1$, $FB_1$, $IID_0$, $FB_0$ from the bottom of the IST 113 as shown in FIG. 3. In addition, the branch bit of the instructions are read from the bottom of the IST 113 and supplied to the BTAT 115. For example, $BB_2$, $BB_1$, and $BB_0$ may be read from the bottom of the IST 113 as shown in FIG. 3. For each instruction whose FB is set (i.e. the instruction is a completed instruction), the PCU control logic 200 accesses the BTAT 115 with a completion IID (C_IID) that corresponds to the IID of that instruction. It is important to realize that there may be more than one completed instruction read from the bottom of the IST 113. For example, the instruction identified by $IID_1$ may be a completed instruction whose corresponding $FB_1$ is set, and the instruction identified by $IID_0$ may be a completed instruction whose corresponding $FB_0$ is set. In this case, the PCU control logic 200 accesses the BTAT 115 with both a $C\_IID_1$, and $C\_IID_0$ that corresponds to $IID_1$ and $IID_0$, respectively.

As described above, the BTAT 115 stores the IID, usage bit U, target address TA, and resolution status field RSF of the branch instructions currently dispatched for execution. More particularly, with reference to FIG. 6, the entries may be arranged as an array 300. The array may be organized as a fully associative structure, a set associative structure, or a direct mapped structure. As shown, the array 300 is organized as a fully associative structure for example only. Moreover, the array 300 as shown includes four entries for example only.

More specifically, the target address TA of each entry is provided as an input to target address multiplexing logic 302. The RSF of each entry is provided as an input to RSF multiplexing logic 304. The IID field $IID_M$ and usage bit $U_M$ of the first entry is supplied to matching circuits M1,M2,M3. The IID field $IID_{M-1}$ and usage bit $U_{M-1}$ of the second entry is supplied to matching circuits M4,M5,M6. The IID field $IID_{M-2}$ and usage bit $U_{M-2}$ of the third entry is supplied to matching circuits M7,M8,M9. Finally, the IID field $IID_{M-2}$ and usage bit $U_{M-3}$ of the fourth entry is supplied to matching circuits M10,M11,M12.

An input identifier bus 306 supplies the completion IID tag (C_IID) of each of the completed branch instructions provided by the PCU control logic 200 to the appropriate matching circuits M1,M2,M3 . . . M12. Because it is possible that three taken branch instructions have been completed, the input identifier bus 302 may supply to the matching circuits the completion IID tag ($C\_IID_2$, $C\_IID_1$, $C\_IID_0$) of three completed branch instructions. In this case, the first completion IID tag ($C\_IID_2$) is supplied to the matching circuits M1,M4,M7 and M10. The second completion IID tag ($C\_IID_1$) is supplied to the matching circuits M2,M5,M8 and M11. And the third completion IID tag ($C\_IID_0$) is supplied to the matching circuits M3,M6,M9 and M12.

Figure 7:
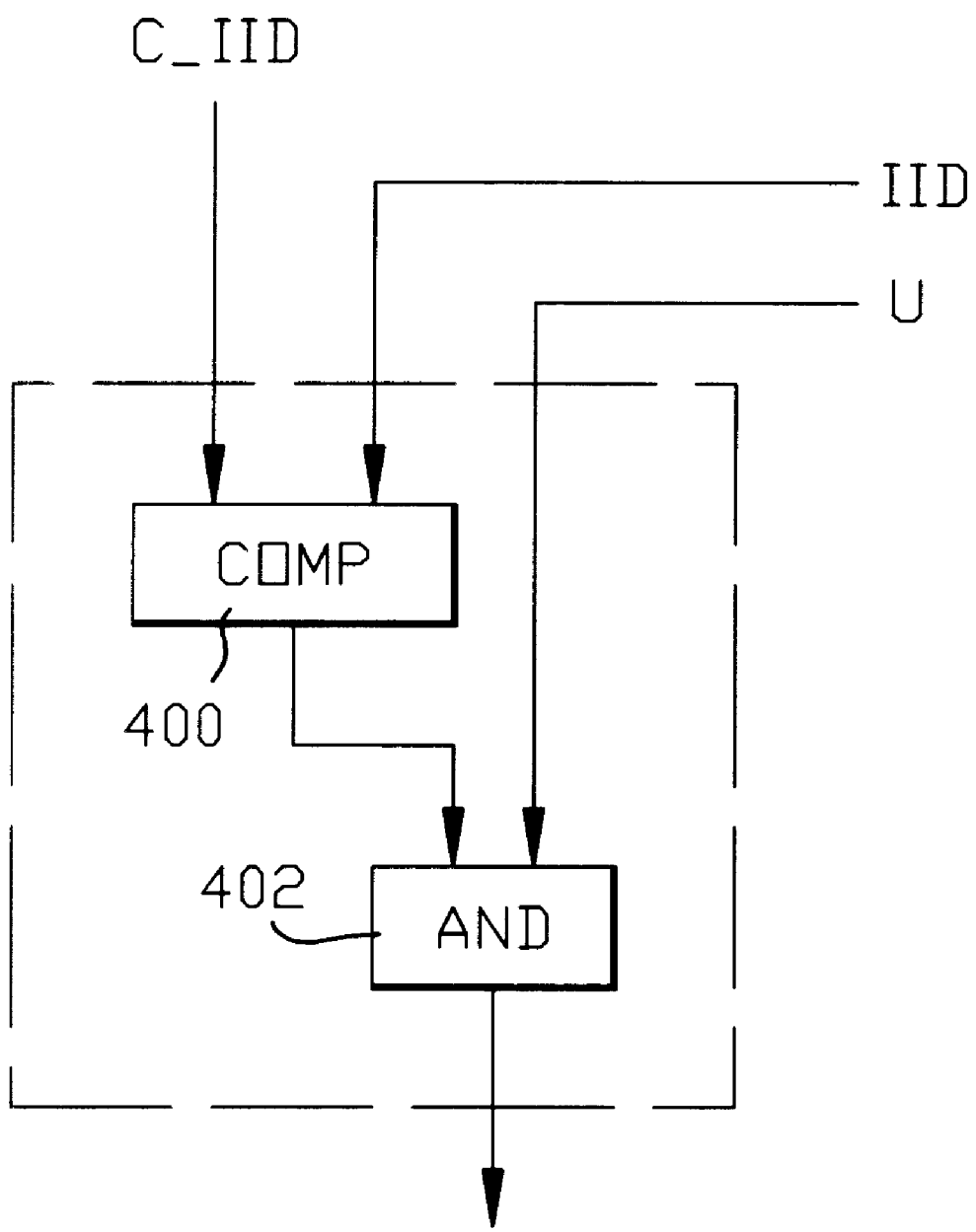
FIG. 7 is a functional block diagram of a hardware implementation of the matching circuits M1 . . . M12 of FIG. 6.

As shown in FIG. 7, the matching circuits include a comparator 400 that compares the completion IID tag supplied via the input identifier bus 302 to the IID field of the respective entry. The output of the comparator 400 and usage bit U of the respective entry is supplied to an AND gate 402. The output of the AND gates 402 of the matching circuits M1 . . . M12 identifies each valid entry that matches the completion IID tags supplied via the input identifier bus 306. This output is supplied to mux control logic 308.

The mux control logic 308 controls the operation of the target address multiplexing logic 302 and RSF multiplexing logic 304. More specifically, if the output of the matching circuit M1 indicates that a valid entry $IID_M$ matches the completion IID tag $C\_IID_2$, the mux control logic 308 controls the target address multiplexing logic 302 to output $TA_M$ as $TA_2$ and the RSF multiplexing logic 304 to output $RSF_M$ as $RSF_2$. Similarly, if the output of the matching circuit M2 indicates that a valid entry $IID_M$ matches the completion IID tag $C\_IID_1$, the mux control logic 308 controls the target address multiplexing logic 302 to output $TA_M$ as $TA_1$ and the RSF multiplexing logic 304 to output $RSF_M$ as $RSF_1$. The operation of the mux control logic 308 is similar for other matches indicated by the outputs of the matching circuits M3 . . . M12.

Figure 6B:
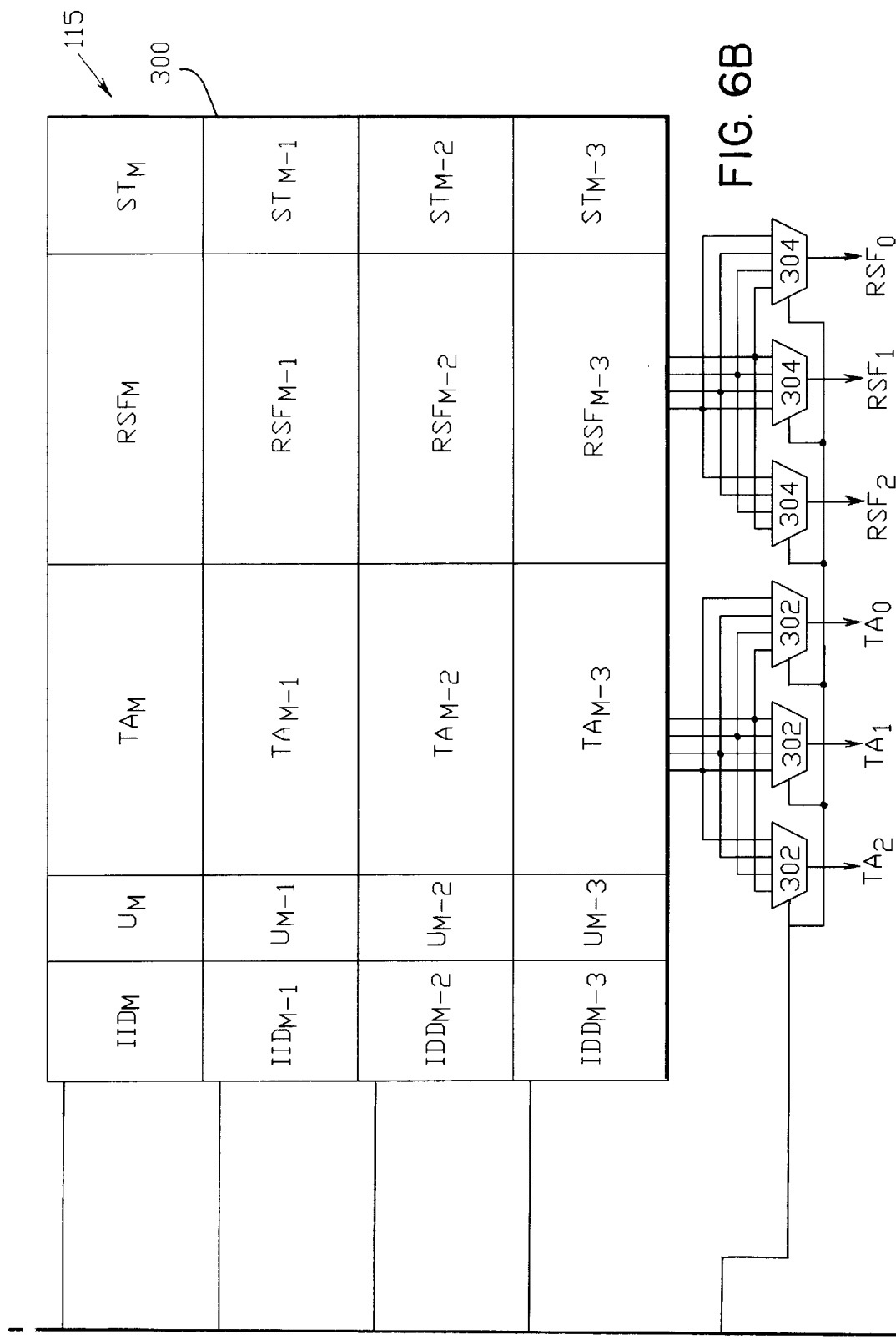
FIG. 6 is a functional block diagram of a hardware implementation of the BTAT of FIG. 2.

The output of the matching circuits M1 . . . M12 is also supplied to hit recognition logic 310. In the simplest approach, the hit recognition logic 310 outputs a hit/miss signal ($H/M_2$, $H/M_1$, $H/M_0$) that indicates if a valid matching entry exists for each completion IID tag ($C\_IID_2$, $C\_IID_1$, $C\_IID_0$) supplied to the BTAT 115 via the input identifier bus 306. However, because the hit recognition logic 310 relies solely on matching the completion IID tags to the IID fields of the entries, this approach may be prone to error. In the preferred embodiment, as shown in FIG. 6, an input branch bit bus 312 supplies the branch bits $BB_2$, $BB_1$, and $BB_0$ read out from the bottom of the IST 113 to the hit recognition logic 310. In this case, the hit recognition logic 310 outputs a hit/miss signal ($H/M_2$, $H/M_1$, $H/M_0$) that indicates if the following two conditions have been met: [1] a valid matching entry exists for each completion IID tag ($C\_IID_2$, $C\_IID_1$, $C\_IID_0$) supplied to the BTAT 115 via the input identifier bus 306, and [2] the corresponding branch bit ($BB_2$, $BB_1$, $BB_0$) supplied from the IST 113 via the input branch bit bus 312 is set. Because the hit recognition logic 310 of the preferred embodiment generates the hit/miss signal according to the two conditions, the hit recognition logic 310 of the preferred embodiment is less prone to error.

Thus, for each completion IID tag supplied to the BTAT 115, the BTAT 115 returns a hit/miss signal, the corresponding target address TA if appropriate, and the corresponding resolution status field (RSF) if appropriate.

As shown in FIG. 5, the PCU 111 includes an output driver 500 that outputs the address of the next instruction to be completed. For example, the address may be a 62 bit value as shown. In this case, the full memory address of the instruction may be a 64 bit value with the lower order two bits set to zero. Generally, the output driver 500 is controlled by the PCU control logic 200 to output the address of the next instruction to be completed according to the hit/miss signals (H/M$_2$, H/M$_1$, H/M$_0$, target addresses (TA$_2$, TA$_1$, TA$_0$) and resolution status fields (RSF$_2$, RSF$_1$, RSF$_0$) output from the BTAT 115.

More specifically, the address output by the output driver 500 and the target addresses output from the BTAT 115 is supplied to a multiplexer 502 whose output is supplied to a staging register 504. The address stored in the staging register 504 is divided into two portions, a most significant portion and a least significant portion. For example, the most significant portion may be the most significant 58 bits and the least significant portion may be the least significant 4 bits of the full address as shown. The most significant portion of staging register 504 is supplied to a multiplexer 506 and an incrementer 508 for update. The least significant portion of the staging register 504 is supplied to offset generation logic 510 for update.

The offset generation logic 510, which may be a full adder as shown, performs two functions. First, the offset generation logic 510 updates the least significant portion of the staging register 504 according to an offset signal supplied by the PCU control logic 200 and supplies the updated least significant portion to the driver 500 for output. Secondly, the offset generation logic controls the multiplexer 306 to pass to the driver 500 either the most significant portion output for the staging register 504 or the most significant portion+1 output from the incrementer 508 if necessary, thus updating the most significant portion of the address output by the output driver 500.

Upon receiving from the BTAT 115 one hit signal and corresponding RSF indicating that a single branch instruction has been completed and resolved taken, the PCU control logic 200 controls the multiplexer 502 to pass to the input of the staging register 504 the appropriate one of the target addresses TA$_2$, TA$_1$, TA$_0$ output from the BTAT 115 that corresponds to the single branch instruction, and controls the staging register 504 to load selected target address. The PCU control logic 200 also outputs an offset signal associated with sequential instructions completed subsequent to the single branch instruction in the same machine cycle as described above. The offset generation logic 510 adds the offset signal supplied by the PCU control logic 200 to the corresponding lower portion of the target address stored in to the staging register 504, and outputs the resultant data to the driver 500 for output. In addition, upon determining a carry is required, the offset generation logic 510 controls the multiplexer 506 to pass the most significant portion+1 output from the incrementer 508 to the driver 500 for output, otherwise the offset generation logic 510 controls the multiplexer 506 to pass the most significant portion output from staging register 504 to the driver 500 for output. Importantly, the incrementer 508 is utilized to update the most significant portion when a carry is required, thus obviating the need for a full adder for the full address (e.g, 64 bits as shown) stored in the staging register 304.

Upon receiving from the BTAT 115 more than one hit signal and corresponding RSF indicating that more than one branch instruction has been completed and resolved taken, the PCU control logic 200 controls the multiplexer 502 to pass to the input of the staging register 504 the appropriate one of the target addresses TA$_2$, TA$_1$, TA$_0$ output from the BTAT 115 that corresponds to a particular branch instruction of the more than one branch instructions that have been completed and resolved taken, wherein the particular branch instruction is latter in sequence than the other of the more than one branch instructions that have been completed and resolved taken, and controls the staging register 504 to load selected target address. The PCU control logic 200 also outputs an offset signal associated with sequential instructions completed subsequent to the particular branch instruction in the same machine cycle as described above. The offset generation logic 510 adds the offset signal supplied by the PCU control logic 200 to the corresponding lower portion of the target address stored in to the staging register 504, and outputs the resultant data to the driver 500 for output. In addition, upon determining a carry is required, the offset generation logic 510 controls the multiplexer 506 to pass the most significant portion+1 output from the incrementer 508 to the driver 500 for output, otherwise the offset generation logic 510 controls the multiplexer 506 to pass the most significant portion output from staging register 504 to the driver 500 for output.

Upon receiving all miss signals from the BTAT 115, the PCU control logic 200 controls the multiplexer 502 to pass the address output by the driver 500 to the input of the staging register 504, and controls the staging register 504 to load the address. The PCU control logic 200 outputs an offset signal associated with the sequential instructions completed in the machine cycle. The offset generation logic 510 adds the offset signal supplied by the PCU control logic 200 to the corresponding lower portion of the address stored in to the staging register 504, and outputs the resultant data to the driver 500 for output. In addition, upon determining a carry is required, the offset generation logic 510 controls the multiplexer 506 to pass the most significant portion+1 output from the incrementer 508 to the driver 500 for output, otherwise the offset generation logic 510 controls the multiplexer 506 to pass the most significant portion output from staging register 504 to the driver 500 for output.

Upon experiencing an interrupt or program exception, the interrupt controller (not shown) saves the address of the next instruction to be completed as output from the output driver 500 into a storage register via the PC_to_SPR Bus 512. As is conventional, the storage register may be the machine status save/restore register (SRR0) or the link register (LR). The interrupt controller then places the interrupt entry address, also commonly called an interrupt vector, on the SPR_TO_PC Bus 514, and sends an interrupt request to the PCU control logic 200 via the interrupt control bus 202. Upon receiving the interrupt request signal, the PCU control logic 200 controls the multiplexer 502 to load the interrupt entry address into the staging register 504 and zeroes the offset signal output to the offset generation logic 510. The offset generation logic 510 controls the multiplexer 506 to load the interrupt entry address into the driver 500 for output, and processing continues to execute the interrupt.

To return from the interrupt or exception, the interrupt controller places the return address previously stored in the storage register onto the SPR_to_PC bus 514, and sends an interrupt return signal to the PCU control logic 200 via the interrupt control bus 202. Upon receiving the interrupt return signal, the PCU control logic 200 controls the multiplexer 502 to load the return address into the staging register 504 and zeroes the offset signal output to the offset generation logic 510. The offset generation logic 510 controls the multiplexer 506 to load the return address into the driver 500 for output, and processing continues to execute the instruction stream at the returned address.

As described above, the completion IID tag of one or more completed instructions (i.e., one or more instructions whose FB is set) and the corresponding branch bit BB are supplied from the IST 113 to the BTAT 115 to locate a valid matching entry in the BTAT 115. However, in an alternate embodiment, the BTAT 115 may be accessed with only the completion IID tag of the one or more completed branch instructions read from the IST 113. More specifically, the PCU control logic 200, in each machine cycle, may read from the IST 113 the IID, BB and FB corresponding to the maximum number of instructions that may be completed by the processor unit 103 in the cycle. For each instruction whose FB and BB is set (i.e. the instruction is a completed branch instruction), the PCU control logic 200 accesses the BTAT 115 with a completion IID (C_IID) that corresponds to the IID of that instruction. The BTAT 115 includes a similar structure as described above with respect to FIG. 6; however, the hit recognition logic 310 is not supplied with the branch bits ($BB_2$, $BB_1$, $BB_0$) read from the IST 113. In this alternate embodiment, only the output of the matching circuits M1 . . . M12 is supplied to the hit recognition logic 310 which outputs a hit/miss signal ($H/M_2$, $H/M_1$, $H/M_0$) that indicates if a valid matching entry exists for each completion IID tag ($C\_IID_2$, $C\_IID_1$, $C\_IID_0$) supplied to the BTAT 115 via the input identifier bus 306.

According to a second embodiment of the present invention, the structure and operation of the instruction sequence table (IST), branch target address table (BTAT) and a PCU control unit as described above may be modified slightly. In this embodiment, the finishing bit FB of the entries of the IST 113 indicate whether or not the instruction corresponding to the entry has finished execution, as distinguished from indicating whether or not the instruction has been completed as described above. When set, the FB may indicate that the corresponding instruction has finished execution. When not set, the FB may indicate the instruction is not yet finished execution. The FB of the entries are updated by the IST control unit 123 according to execution results supplied to the IST control unit 123 by the hardware execution elements of the processor unit 103.

Figure 8:
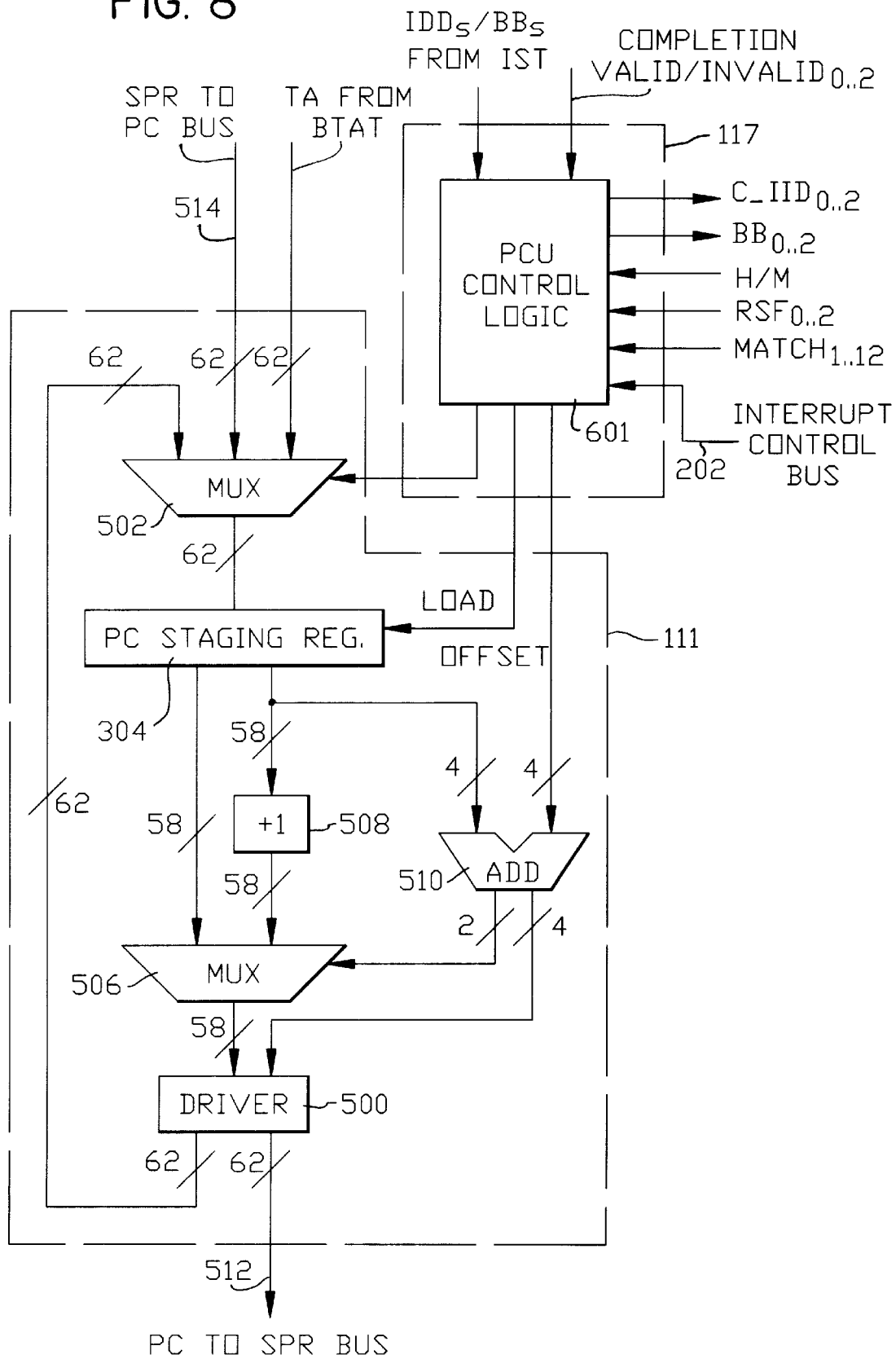
FIG. 8 is a functional block diagram of the Program Counter Unit (PCU) and PCU Control Unit of FIG. 2 according to a second embodiment of the present invention.

In this case, during each machine cycle, the PCU control unit 117 reads the IID and BB of one or more instructions from the IST 113 and accesses the BTAT with the IID and BB of the particular instruction. The IID and BB for each instruction read from the IST 113 may be supplied to the BTAT 115 directly, or via the PCU control unit 117 as shown in FIG. 8.

In addition, the IID and FB of the instructions read from the IST 113 are supplied to the completion unit 108. For each instruction read from the IST 113, the completion unit 108 analyzes the FB of the instructions and exception bits generated by the hardware execution elements of the processor unit 103 to determine {1} if the instruction has finished execution and [2] if the instruction failed to generate an interrupt. For each instruction read from the IST 113, if these two conditions have been met, the completion unit 108 generates a completion valid signal; otherwise, the completion unit 108 generates a completion invalid signal. The completion valid/invalid signals generated by the completion unit 108 are also supplied to the BTAT.

For each instruction read from the IST 113, the BTAT determines whether the IID of the instruction matches the IID of stored branch instructions, generates match signals according thereto, and outputs the resolution status of each matching entry. In parallel, for each instruction read from the IST 113, the BTAT queries [1] whether the IID of the instruction matches the IID of stored branch instructions, [2] whether the BB corresponding to the instruction is set, [3] whether a completion valid signal corresponding to the instruction was generated by the completion unit 108, and [4], if there is a matching entry, whether the resolution status field of the matching entry indicates the instruction has been resolved taken. If all four conditions are met for a single instruction read from the IST 113, the BTAT outputs the target address of the single instruction and a hit signal that indicates a valid match was found. If all four conditions are met for more than one instruction read from the IST 113, the BTAT outputs the target address of a particular instruction of the more than one instructions that satisfy the four conditions, wherein the particular instruction is latter in program sequence than the other instructions of the more than one instructions that satisfy the four conditions, and also outputs a hit signal indicating that a valid match was found. However, if all four conditions are not met for any of the instructions read from the IST 113, the BTAT 115 outputs a miss signal indicating a valid match was not found.

According to the hit/miss signal, match signals and resolution status signals output from the BTAT 115 and completion valid/invalid signals generated by the completion unit 108, the PCU control unit 117 determines an offset. If a hit is found, the offset corresponds to the number of sequential instructions completed after the latest completed branch instruction resolved taken. However, if a miss is encountered, the offset signal corresponds to the number of completed sequential instructions. Moreover, if the hit/miss signal indicates a hit was found, the PCU control unit utilizes the target address TA output from the BTAT 115 plus offset to update the PCU 111. Otherwise, if the hit/miss signal indicates a miss, the PCU control unit utilizes the offset and the sequential address output from the output driver 500 to update the PCU 111.

More specifically, with reference to FIG. 8, the PCU control unit 117 includes PCU control logic 601 that in each machine cycle reads from the IST 113 the IID and BB corresponding to the maximum number of instructions that may be completed by the processor unit 103 in the cycle. For example, the PCU control logic 601 may read $IID_2$, $BB_2$, $IID_1$, $BB_1$, $IID_0$, $BB_0$ from the bottom of the IST 113 as shown in FIG. 3.

In addition, the IID and FB of the instructions read from the IST 113 are supplied to the completion unit 108. For example, $IID_2$, $FB_2$, $IID_1$, $FB_1$, $IID_0$, $FB_0$ as shown in FIG. 3 are supplied to the completion unit 108. For each instruction read from the IST 113 ($IID_2$, $IID_1$, $IID_0$) the completion unit 108 analyzes the FB ($FB_2$, $FB_1$, $FB_0$) of the instruction and exception bits generated by the hardware execution elements of the processor unit 103 to determine {1} if the instruction has finished execution, and [2] if the instruction failed to generate an interrupt (which is or will be handled by an interrupt controller). For each instruction read from the IST 113, if these two conditions have been met, the completion unit 108 generates a completion valid signal (completion valid$_{0 \ldots 2}$); otherwise, the completion unit 108 generates a completion invalid signal (completion invalid$_{0 \ldots 2}$) The completion valid/invalid signals (completion valid/invalid$_{0 \ldots 2}$) generated by the completion unit 108 are also supplied to the BTAT.

The BTAT of the second embodiment is shown in FIG. 9. Like the BTAT of the first embodiment, the target address TA of each entry is provided as an input to target address multiplexing logic 302. The RSF of each entry is provided as an input to RSF multiplexing logic 304. Moreover, the IID field $IID_M$ and usage bit $U_M$ of the first entry is supplied to matching circuits M1,M2,M3. The IID field $IID_{M-1}$ and usage bit $U_{M-1}$ of the second entry is supplied to matching circuits M4,M5,M6. The IID field $IID_{M-2}$ and usage bit $U_{M-2}$ of the third entry is supplied to matching circuits M7,M8,M9. Finally, the IID field $IID_{M-3}$ and usage bit $U_{M-3}$ of the fourth entry is supplied to matching circuits M10, M11,M12. An input identifier bus 306 supplies the IID tag (C_IID) of each of the instructions provided by the PCU control logic 601 to the appropriate matching circuits M1,M2,M3 . . . M12. Because it is possible that three taken branch instructions have been completed in a cycle, the input identifier bus 302 may supply to the matching circuits the completion IID tag (C_IID$_2$, C_IID$_1$, C_IID$_0$) of three completed branch instructions. In this case, the first completion IID tag (C_IID$_2$) is supplied to the matching circuits M1,M4,M7 and M10. The second completion IID tag (C_IID$_1$) is supplied to the matching circuits M2,M5,M8 and M11. And the third completion IID tag (C_IID$_0$) is supplied to the matching circuits M3,M6,M9 and M12.

The output of matching circuits M1 . . . M12, designated as match signals$_{1\ldots12}$, are supplied to RSF mux control logic 701. The RSF mux control logic 701 controls the operation of the RSF multiplexing logic 304 according to the match signals$_{1\ldots12}$. More specifically, if the output of the matching circuit M1 (i.e., match signal$_1$) indicates that a valid entry IID$_M$ matches the completion IID tag C_IID$_2$, the RSF mux control logic 701 controls the RSF multiplexing logic 304 to output RSF$_M$ as RSF$_2$. Similarly, if the output of the matching circuit M2 (i.e., match signal$_2$) indicates that a valid entry IID$_M$ matches the completion IID tag C_IID$_1$, the RSF mux control logic 501 controls the RSF multiplexing logic 701 to output RSF$_M$ as RSF$_1$. The operation of the RSF mux control logic 701 is similar for other matches indicated by the outputs of the matching circuits M3 . . . M12.

The match signals$_{1\ldots12}$ are also supplied to hit recognition and selection logic 703, which is also provided with the branch bits (BB$_2$, BB$_1$, and BB$_0$) read from the bottom of the IST 113, the completion valid/invalid signals (completion valid/invalid$_{0\ldots2}$) generated by the completion unit 108, and the RSF status fields (RSF$_2$, RSF$_1$, RSF$_0$) of matching entries output from the RSF multiplexing logic 304. The hit recognition and selection logic 703 determines, for each instruction read from the IST 113, [1] whether the matching signals$_{1\ldots12}$ indicate the IID corresponding to the instruction matches the IID of stored branch instructions, [2] whether the BB corresponding to the instruction is set, [3] whether a completion valid signal corresponding to the instruction was generated by the completion unit 108, and [4], if there is a matching entry, whether the resolution status field of the matching entry indicates the instruction has been resolved taken. If all four conditions are met for a single instruction read from the IST 113, the hit recognition and selection logic 703 controls the target address multiplexing logic 302 to output the target address TA of the single instruction, and outputs a hit signal H that indicates a valid match was found.

If all four conditions are met for more than one instruction read from the IST 113, the hit recognition and selection logic 703 controls the target address multiplexing logic 302 to output the target address TA of a particular instruction of the more than one instructions that satisfy the four conditions, wherein the particular instruction is latter in program sequence than the other instructions of the more than one instructions that satisfy the four conditions, and also outputs a hit signal H indicating that a valid match was found. However, if all four conditions are not met for any of the instructions read from the IST 113, the BTAT 115 outputs a miss signal M indicating a valid match was not found.

According to the hit/miss signal, the match signals$_{1\ldots12}$ and the resolution status signals (RSF$_0$, RSF$_1$, RSF$_2$) output from the BTAT 115 and the completion valid/invalid signals$_{0\ldots2}$ generated by the completion unit 108, the PCU control logic 601 determines an offset. If a hit is found, the offset corresponds to the number of sequential instructions completed after the latest completed branch instruction resolved taken. However, if a miss is encountered, the offset corresponds to the number of completed sequential instructions. Moreover, if the hit/miss signal indicates a hit was found, the PCU control logic 601 utilizes the target address TA output from the BTAT 115 plus offset to update the PCU 111. Otherwise, if the hit/miss signal indicates a miss, the PCU control logic 601 utilizes the offset and the sequential address output by the output driver 500 to update the PCU 111. The operation of the PCU control logic 601 in utilizing the target address and offset to update the PCU 111 is similar to the operation of the PCU control logic 200 as described above with respect to the first embodiment.

In a simpler approach, the hit recognition and selection logic 703 of FIG. 9 may generate the hit/miss signal that indicates if a valid matching entry exists for the completion IID tags (C_IID$_2$, C_IID$_1$, C_IID$_0$) without checking the status of the branch bits (BB$_2$, BB$_1$, BB$_0$) of the corresponding instructions. However, in this case, because the hit recognition and selection logic 703 relies on matching the completion IID tags to the IID fields of the entries, this approach may be prone to error.

In summary, the computer processing unit of the present invention utilizes an IST and BTAT to update a program counter unit that stores the address of the last completed instruction. Because the IST and BTAT employ efficient IID tags to identify instructions that modify the control flow of the execution pipeline and the target address of such instructions, the computer processing unit of the present invention need not store the full address of each instruction in the execution pipeline to update the program counter as is conventional, and thus saves real estate that may be used for other circuitry.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. A method of generating an address of the next instruction to be completed in a computer processing unit, the method comprising the steps of:

for each instruction dispatched for execution,
generating an identifier that identifies the instruction;
adding an entry to a first table, wherein said entry of said first table comprises said identifier and a completion status field that indicates if the corresponding instruction is complete;
if the instruction is a branch instruction, adding an entry to a second table, wherein said entry of said second table comprises said identifier, a target address of the instruction and a resolution status field that indicates at least if the instruction has been resolved taken or has been resolved not taken;

updating the completion status field of entries of said first table corresponding to completed instructions;

updating the resolution status field of entries of said second table according to resolution of branch instructions; and in each machine cycle, controlling a program counter to generate the address of the next instruction to be completed according to said entries of said first table and said second table, wherein the following steps are performed in a given machine cycle, reading out at least one entry from said first table; and for each entry read from said first table whose completion status field indicates the associated instruction is completed, accessing said second table with the associated identifier of the entry to thereby determine said address of the next instruction to be completed in said computer processing unit.

2. The method of claim 1, wherein the step of controlling a program counter to generate the address of the next instruction to be completed includes the following steps performed in said given machine cycle:

accessing said second table with the associated identifier of the entry to determine if a valid matching entry exists in said second table:

if said second table includes a single valid matching entry whose resolution status field indicates the instruction has been resolved taken, updating the program counter to correspond to the target address of said single valid matching entry plus offset associated with subsequent completed sequential instructions;

if said second table includes more than one valid matching entry whose resolution status field indicates the instruction has been resolved taken, updating the program counter to correspond to the target address of one of said more than one valid matching entries plus offset associated with subsequent completed sequential instructions, wherein said one of said more than one valid matching entries corresponds to an instruction latter in program sequence than instructions corresponding to other of said more than one valid matching entries; and if said second table does not include at least one valid matching entry whose resolution status field indicates the instruction has been resolved taken, updating the program counter to correspond to the address associated with completed sequential instructions.

3. The method of claim 1, wherein each of said entries of said first table include a branch bit that indicates if the corresponding instruction is a branch instruction.

4. The method of claim 3, wherein the step of controlling a program counter to generate the address of the next instruction to be completed according to said entries of said first table and said second table includes the steps of:

in each machine cycle, reading out one or more entries from said first table;

for each entry read from said first table whose completion status field indicates the associated instruction is complete, supplying said second table with the associated identifier of the entry.

5. The method of claim 4, further comprising the steps of:

for each identifier supplied to said second table, generating a hit/miss signal that represents if a valid matching entry exists in said second table and that represents if the branch bit associated with the identifier in said first table indicates the instruction is a branch instruction;

outputting the resolution status field of matching entries from said second table;

outputting the target address of matching entries from said second table;

if said second table includes a single valid matching entry whose resolution status field indicates the instruction has been resolved taken, updating the program counter to correspond to the target address of said single valid matching entry plus offset associated with subsequent completed sequential instructions;

if said second table includes more than one valid matching entry whose resolution status field indicates the instruction has been resolved taken, updating the program counter to correspond to the target address of one of said more than one valid matching entries plus offset associated with subsequent completed sequential instructions, wherein said one of said more than one valid matching entries corresponds to an instruction latter in program sequence than instructions corresponding to other of said more than one valid matching entries; and if said second table does not include at least one valid matching entry whose resolution status field indicates the instruction has been resolved taken, updating the program counter to correspond to the address associated with completed sequential instructions.

6. The method of claim 3, wherein the step of controlling a program counter to generate the address of the next instruction to be completed according to said entries of said first table and said second table includes the steps of:

in each machine cycle, reading out one or more entries from said first table;

for each entry read from said first table whose completion status field indicates the associated instruction is complete and whose branch bit indicates the associated instruction is a branch instruction, supplying said second table with the associated identifier of the entry.

7. The method of claim 6, further comprising the steps of:

for each identifier supplied to said second table, generating a hit/miss signal that indicates if a valid matching entry exists in said second table;

outputting the resolution status field of matching entries from said second table;

outputting the target address of matching entries from said second table;

if said hit/miss signals and said resolution status fields indicate a single valid matching entry exists in said second table, updating the program counter to correspond to the target address of the single valid matching entry plus offset associated with subsequent completed sequential instructions;

if said hit/miss signals and said resolution status fields indicate more than one valid matching entry exists in said second table, updating the program counter to correspond to the target address of one of said more than one valid matching entries plus offset associated with subsequent completed sequential instructions, wherein said one of said more than one valid matching entries corresponds to an instruction latter in program sequence than instructions corresponding to other of said more than one valid matching entries; and if said hit/miss signals and said resolution status fields indicates that no valid matching entries exist in said second table, updating the program counter to correspond to the address associated with completed sequential instructions.

8. An apparatus for use in a computer processing unit for generating an address of the next instruction to be completed, said apparatus comprising:

a first table for storing a plurality of entries each corresponding to a dispatched instruction, each entry comprising an identifier that identifies the associated instruction and a completion status field that indicates if the associated instruction is complete;

a second table for storing a plurality of entries each corresponding to a dispatched branch instruction, each entry comprising the same identifier stored in said first table, a target address of the dispatched branch instruction and a resolution status field that indicates at least if the corresponding branch instruction has been resolved taken or has been resolved not taken;

program counter update logic that, in each machine cycle, updates a program counter with the address of the next instruction to be completed according to said entries stored in said first table and said second table, wherein said program counter update logic in a given machine cycle,
  reads out at least one entry from said first table; and
  for each entry read from said first table whose completion status field indicates the associated instruction is completed, accesses said second table with the associated identifier of the entry to thereby determine said address of the next instruction to be completed in said computer processing unit.

9. The apparatus of claim 8, wherein, said program counter update logic, in said given machine cycle,
  reads out one or more entries from said first table, and, for each entry whose status bit indicates the associated instruction is complete, accesses said second table with the associated identifier of the entry to determine if a valid matching entry exists in said second table;
  if said second table includes a single valid matching entry whose resolution status field indicates the instruction has been resolved taken, updates the program counter to correspond to the target address of said single valid matching entry plus offset associated with subsequent completed sequential instructions;
  if said second table includes more than one valid matching entry whose resolution status field indicates the instruction has been resolved taken, updates the program counter to correspond to the target address of one of said more than one valid matching entries plus offset associated with subsequent completed sequential instructions, wherein said one of said more than one valid matching entries corresponds to an instruction latter in program sequence than instructions corresponding to other of said more than one valid matching entries; and
  if said second table does not include at least one valid matching entry whose resolution status field indicates the instruction has been resolved taken, updates the program counter to correspond to the address associated with completed sequential instructions.

10. The apparatus of claim 8, wherein each of said entries of said first table include a branch bit that indicates if the corresponding instruction is a branch instruction.

11. The apparatus of claim 10, wherein said program counter update logic, in each machine cycle,
  reads out one or more entries from said first table;
  for each entry read from said first table whose completion status field indicates the associated instruction is complete, said program counter update logic supplies said second table with the associated identifier of the entry.

12. The apparatus of claim 11, wherein said program counter update logic,
  for each identifier supplied to said second table, generates a hit/miss signal that represents if a valid matching entry exists in said second table and that represents if the branch bit associated with the identifier in said first table indicates the instruction is a branch instruction;
  outputs the resolution status field of matching entries from said second table;
  outputs the target address of matching entries from said second table;
  if said hit/miss signals and said resolution status fields indicate a single valid matching entry exists in said second table, updates the program counter to correspond to the target address of the single valid matching entry plus offset associated with subsequent completed sequential instructions;
  if said hit/miss signals and said resolution status fields indicate more than one valid matching entry exists in said second table, updates the program counter to correspond to the target address of one of said more than one valid matching entries plus offset associated with subsequent completed sequential instructions, wherein said one of said more than one valid matching entries corresponds to an instruction latter in program sequence than instructions corresponding to other of said more than one valid matching entries; and
  if said hit/miss signals and said resolution status fields indicates that no valid matching entries exist in said second table, updates the program counter to correspond to the address associated with completed sequential instructions.

13. The apparatus of claim 10, wherein said program counter update logic, in each machine cycle,
  reads out one or more entries from said first table; and
  for each entry read from said first table whose completion status field indicates the associated instruction is complete and whose branch bit indicates the associated instruction is a branch instruction, supplies said second table with the associated identifier of the entry.

14. The apparatus of claim 13, wherein said program counter update logic,
  for each identifier supplied to said second table, generates a hit/miss signal that indicates if a valid matching entry exists in said second table;
  outputs the resolution status field of matching entries from said second table;
  outputs the target address of matching entries from said second table;
  if said hit/miss signals and said resolution status fields indicate a single valid matching entry exists in said second table, updates the program counter to correspond to the target address of the single valid matching entry plus offset associated with subsequent completed sequential instructions;
  if said hit/miss signals and said resolution status fields indicate more than one valid matching entry exists in said second table, updates the program counter to correspond to the target address of one of said more than one valid matching entries plus offset associated with subsequent completed sequential instructions, wherein said one of said more than one valid matching entries corresponds to an instruction latter in program sequence than instructions corresponding to other of said more than one valid matching entries; and
  if said hit/miss signals and said resolution status fields indicates that no valid matching entries exist in said second table, updates the program counter to correspond to the address associated with completed sequential instructions.

15. A method of generating an address of the next instruction to be completed in a computer processing unit, the method comprising the steps of:

for each instruction dispatched for execution,
generating an identifier that identifies the instruction;
adding an entry to a first table, wherein said entry of said first table comprises said identifier and a branch bit that indicates if the instruction is a branch instruction;
if the instruction is a branch instruction, adding an entry to a second table, wherein said entry of said second table comprises said identifier, a target address of the instruction and a resolution status field that indicates at least if the instruction has been resolved taken or has been resolved not taken;
updating the resolution status field of one or more entries of said second table according to resolution of branch instructions; and
in each machine cycle, reading one or more entries from said first table,
generating a completion status signal corresponding to each of said one or more entries read from said first table, wherein said completion status signal indicates if the instruction associated with each entry is completed, and
controlling a program counter to generate the address of the next instruction to be completed according to said entries of said second table and said completion status signal.

16. The method of claim 15, wherein the step of controlling a program counter to generate the address of the next instruction to be completed according to said entries of said second table and said completion status signal includes the steps of:

generating a match signal that indicates if identifiers of said entries read from said first table match identifiers of said entries stored in said second table;
outputting the resolution status field of matching entries from said second table according to said match signal;
if the match signal indicates that the identifier of only one entry read from said first table matches the identifiers of said entries stored in said second table, and the corresponding branch bit of the one entry indicates the associated instruction is a branch instruction, and the completion status signal corresponding to the one entry indicates the associated instruction is complete, generating a hit signal that indicates a valid match was found and outputting the target address of the entry of said second table that corresponds to the matching one entry of said first table;
if the match signal indicates that the identifier of more than one of said entries read from said first table matches said identifiers of said entries stored in said second table, and the corresponding branch bit of each of said more than one entries read from said first table indicates the associated instruction is a branch instruction, and the completion status signal corresponding to the each of said more than one entries read from said first table indicates the associated instruction is completed, generating a hit signal that indicates a valid match was found and outputting the target address of one entry of said second table that corresponds to one of said more than one entries read from said first table, wherein said one entry of said second table corresponds to an instruction latter in program sequence than instructions corresponding to other of said more than one entries read from said first table;
if the match signal indicates none of the identifiers read from said first table match the identifiers of said entries stored in said second table, generating a miss signal;
according to said match signal, said hit/miss signal and the resolution status fields output from said second table, updating the program counter to correspond to the target address output from said second table plus offset associated with subsequent completed sequential instructions.

17. An apparatus for use in a computer processing unit for generating an address of the next instruction to be completed, said apparatus comprising:

a first table for storing a plurality of entries each corresponding to a dispatched instruction, each entry comprising an identifier that identifies the associated instruction and a branch bit that indicates if the associated instruction is a branch instruction;
a second table for storing a plurality of entries each corresponding to a dispatched branch instruction, each entry comprising the same identifier stored in said first table, a target address of the dispatched branch instruction and a resolution status field that indicates at least if the corresponding branch instruction has been resolved taken or has been resolved not taken;
means for generating, in each machine cycle, a completion status signal corresponding to one or more entries read from said first table that indicate if the instructions associated with said one or more entries are completed;
program counter update logic that, in each machine cycle, updates a program counter with the address of the next instruction to be completed according to said entries stored in said second table and said completion status signal.

18. The apparatus of claim 17, wherein said program counter update logic comprises:

matching circuits that generate a match signal indicating if identifiers of said entries read from said first table match identifiers of said entries stored in said second table;
resolution status field multiplexing logic that outputs the resolution status field of matching entries from said second table according to said match signal;
hit recognition and selection logic that
if the match signal indicates that the identifier of only one entry read from said first table matches the identifiers of said entries stored in said second table, and the corresponding branch bit of the one entry indicates the associated instruction is a branch instruction, and the completion status signal corresponding to the one entry indicates the associated instruction is completed, generates a hit signal that indicates a valid match was found and outputs the target address of the entry of said second table that corresponds to the matching one entry of said first table;
if the match signal indicates that the identifier of more than one of said entries read from said first table matches said identifiers of said entries stored in said second table, and the corresponding branch bit of each of said more than one entries read from said first table indicates the associated instruction is a branch instruction, and the completion status signal corresponding to the each of said more than one entries read from said first table indicates the associated instruction is completed, generates a hit signal that indicates a valid match was found and outputs the target address of one entry of said second table that corresponds to one of said more than one entries read from said first table, wherein said one entry of said second table corresponds to an instruction latter in program sequence than instructions corresponding to other of said more than one entries read from said first table;

if the match signal indicates none of the identifiers read from said first table match the identifiers of said entries stored in said second table, generates a miss signal, and control logic that, according to said match signal, said hit/miss signal and the resolution status fields output from said second table, updates the program counter to correspond to the target address output from said second table plus offset associated with subsequent completed sequential instructions.

* * * * *